United States Patent [19]

Oleck et al.

[11] 4,177,163

[45] Dec. 4, 1979

[54] SUPPORTED CATALYST FOR DEMETALATION AND DESULFURIZATION OF HYDROCARBON OILS

[75] Inventors: Stephen M. Oleck, Moorestown; Howard S. Sherry, Cherry Hill, both of N.J.

[73] Assignee: Mobil Oil Corporation, New York, N.Y.

[21] Appl. No.: 884,521

[22] Filed: Mar. 8, 1978

[51] Int. Cl.² .................. B01J 23/10; B01J 21/04; B01J 23/84; B01J 27/04
[52] U.S. Cl. .................. 252/439; 252/462; 208/216 PP; 208/254 H
[58] Field of Search .................. 252/439, 462; 208/216 PP, 216 R, 254 H

[56] References Cited

U.S. PATENT DOCUMENTS

| | | | |
|---|---|---|---|
| 3,345,286 | 10/1967 | Kovach et al. | 208/254 H |
| 3,975,303 | 8/1976 | Eyles et al. | 252/462 |
| 3,993,572 | 11/1976 | Hindin et al. | 252/462 |

*Primary Examiner*—W. J. Shine
*Attorney, Agent, or Firm*—Charles A. Huggett; Raymond W. Barclay; Thomas S. Szatkowski

[57] ABSTRACT

Novel catalyst support, catalyst and process for hydrodemetalizing sulfur and metal-contaminated hydrocarbon oils such as residual petroleum fractions or whole crudes. The process may be used to prepare feedstocks suitable for fluid catalytic cracking. The novel catalyst support is alumina modified with rare earth oxide.

13 Claims, 2 Drawing Figures

CCR REDUCTION OF ARAB LT VAC RESIDUUM AT 2000 PSIG, 0.3 LHSV, ~5000 $\frac{SCF\ H_2}{B}$

SUPPORTED CATALYST FOR DEMETALATION AND DESULFURIZATION OF HYDROCARBON OILS

BACKGROUND OF THE INVENTION

1. Field of the Invention

This invention relates to improved catalysts for hydrodemetalizing and hydrodesulfurizing metal and sulfur-contaminated hydrocarbon oils, especially petroleum fractions such as residual oils. The invention further relates to the preparation and use of such catalysts and the alumina supports thereof.

2. Description of the Prior Art

Hydrocarbon oils may be obtained from various sources such as petroleum, tar sands, coal and oil-bearing shale. Since petroleum is presently the principal source of hydrocarbon oils, the discussion which follows will refer to this source with the understanding that the present invention is applicable to metal and sulfur-contaminated oils regardless of source.

Crude petroleum is separated by distillation into fractions of increasing molecular weight. In general, the demand for the lighter fractions such as gasoline and kerosine exceeds the amount available from distillation alone. Petroleum refiners therefore resort to cracking and hydrocracking the heavier fractions, and to other processes, to convert these to more desirable products. These conversions, particularly cracking and hydrocracking, are generally employed with heavy distillate fractions, however, for reasons hereinbelow described.

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the premature aging of the catalyst and/or formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800° to 1100° F. temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 p.p.m. (parts-per-million by weight) of nickel and vanadium, and containing less than about 2 weight percent sulfur may be used in high valued metallurgical, electrical, and mechanical applications.

Certain residual fractions are currently subjected to visbreaking, which is a heat treatment of milder conditions than used in coking, in order to reduce their viscosity and to make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated, in the absence of added hydrogen, at a temperature of about 800° to 1500° F., a pressure of about 1 to 5 atmospheres, and a space velocity of about 1 to 1000 WHSV.

Typical hydrocracking reactor conditions consists of a temperature of 400° to 1000° F. and a pressure of 100 to 3500 p.s.i.g.

The amount of metals present in a given hydrocarbon stream is often expressed as a chargestock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for catalytic cracking or hydrocracking chargestocks.

Catalysts and processes that utilize such catalysts have been proposed to hydrodemetalize and hydrodesulfurize metal and sulfur-contaminated hydrocarbon oils such as residual petroleum fractions. Such are described for example, in U.S. Pat. Nos. 3,891,541; 3,931,052; 4,016,067 and 4,054,508. Other catalysts and processes directed primarily to removal of sulfur and distillate or residual oils to provide low-sulfur fuels have been proposed.

In the latter category, attention is called to U.S. Pat. No. 3,975,303 issued Aug. 17, 1976 to Eyles which describes a hydrodesulfurization catalyst comprising 1-10% of an iron group metal, 5-25% of a Group VIB metal, and 0.1-10% of a rare earth on a refractory support. The rare earth improves the desulfurization ability of the catalyst and suppresses demetalation.

As a matter of convenience, the catalyst of the present invention will be referred to simply as a hydrodemetalation catalyst since it very effectively reduced the metal content of a treated oil. It is to be understood, of course, that it is effective also for removing sulfur. Catalysts made for hydrodesulfurizing oils also may remove some metal, but this removal is generally regarded as undesirable since it tends to prematurely age the catalyst for its intended use.

SUMMARY OF THE INVENTION

It has now been discovered that an improved catalyst for hydrodemetalation of a hydrocarbon oil comprises 1–10% of an iron group metal and 5–25% of a Group VIB metal based on total catalyst weight on a support precalcined at a temperature of about 1300° to about 1700° F., said support comprising at least 85 wt.% alumina and about 0.5 to about 7.0 wt.% rare earth oxide based on the total weight of said support.

The hereinabove described catalyst is particularly useful in a process for removing both metals and sulfur from a hydrocarbon oil contaminated with such, exhibiting high rates for removal of both contaminants. In a preferred embodiment of said process wherein nickel is employed as the iron group metal of said catalyst, a lower than usual hydrogen pressure or hydrogen circulation rate is used with substantially no loss of demetalation selectivity or activity, as more fully described hereinbelow. The novel process of this invention is also unusually effective in reducing the Conradson Carbon content.

A method for the manufacture of the improved catalyst, more fully described hereinbelow, comprises compositing about 0.5 to about 7.0 wt.% and preferably about 1.0 to about 6.0 wt.%, of rare earth oxide with alumina, and precalcining said composite to a temperature of about 1300° to about 1700° F., and preferably to a temperature of about 1400° to 1600° F., followed by impregnation to provide a catalyst that contains the hereinabove described iron group metal and Group VIB metal. The rare earth oxide content hereinabove described is based on the weight of the precalcined catalyst support.

DETAILED DESCRIPTION OF THE INVENTION

Figure 1:
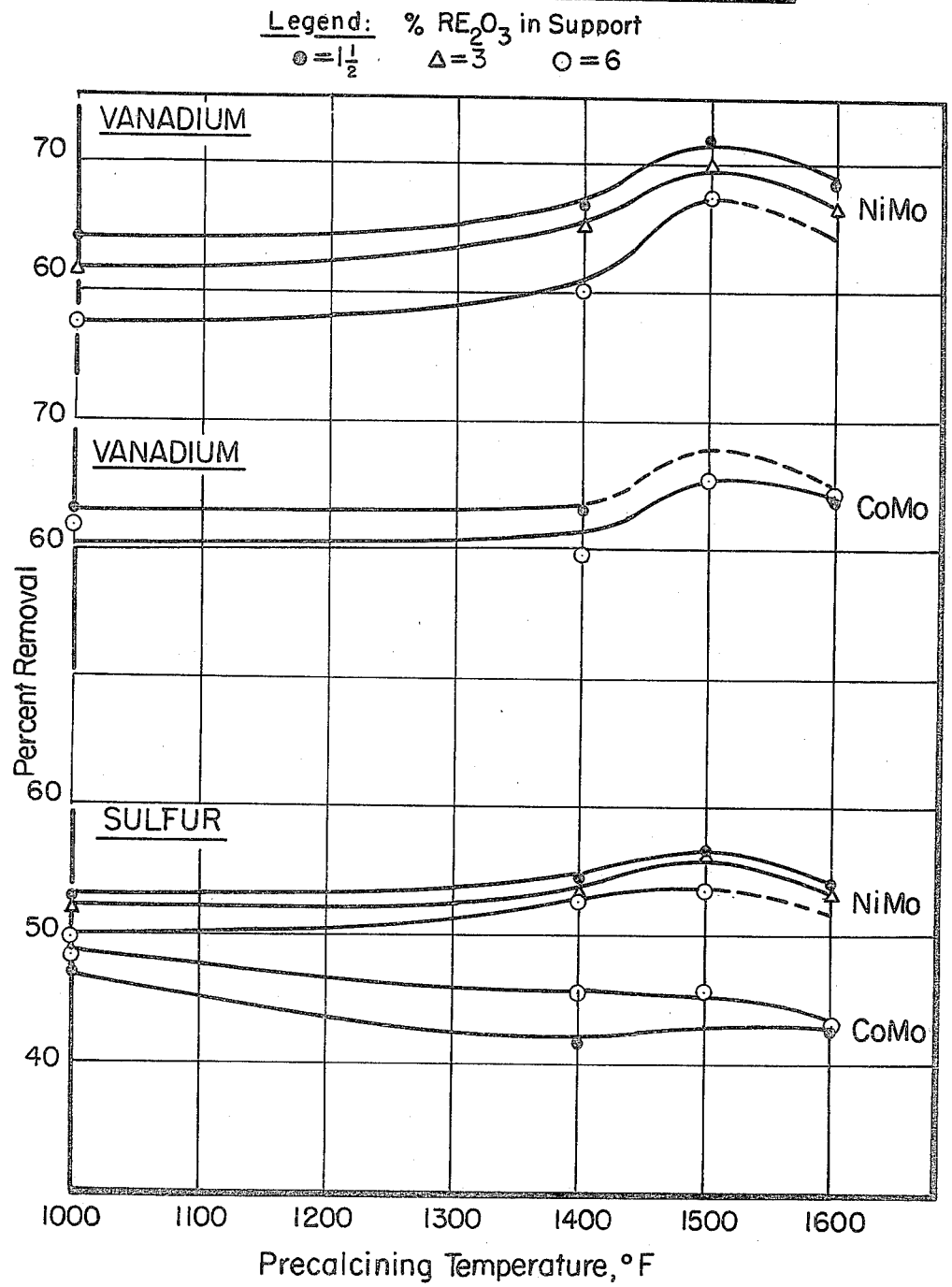
FIG. 1 depicts the effect of precalcination temperature on vanadium and sulfur removal activity.

In seeking to discover an improved hydrodemetalation catalyst for reducing both metal and sulfur concentrations in contaminated oils, it was discovered that this is achieved by providing a novel alumina support that contains rare earth oxide, with said support precalcined to a specific temperature as herein described. The term "precalcined" as referred to herein specifically means heating the composite of alumina and rare earth oxide at least once to the temperature specified prior to addition of the iron group and Group VIB metal. It is believed that this precalcination step is of utmost importance in the present invention. While the reason for its favorable effect is not understood, it has been found that the described precalcination produces a stabilized, improved support with a pore size distribution different from that produced in the absence of rare earth oxide.

It is to be understood, of course, that calcination steps in addition to the prescribed precalcination may be employed in preparing the catalyst of this invention.

The term rare earth oxide as used herein means the oxide or a precursor thereof of an element of Atomic Number 57 to 71. These elements are sometimes referred to as Lanthanides. A single rare earth such as lanthanum or cerium, or a mixture of rare earths may be used to provide the rare earth oxide. Nitrate salts of one or more rare earth elements are suitable precursors, converting to the rare earth oxide on calcination.

It is preferred to use an alpha-alumina monohydrate as the source of alumina for the support and catalyst of this invention. The monohydrate referred to is sometimes characterized as boehmite based on its x-ray diffraction pattern. A particularly useful boehmite is that known as "Catapal SB", which is a very pure form of alumina manufactured and sold by the Conoco Chemicals Div. of Continental Oil Company. Another suitable alumina of the boehmite variety is known as "SA-M medium" alumina marketed by the Kaiser Chemical Company. Both Catapal SB and SA-M medium are characterized by about 25 wt.% loss on ignition, with generally a slightly higher content of sodium and silica impurities for the SA-M variety.

The alumina support is prepared by compositing, in one or more steps, the alumina with the rare earth oxide. Compositing is preferably done by impregnating the alumina with a soluble salt of the rare earth oxide, such as the rare earth nitrate. The preferred composition of the support is at least 85 wt.% alumina, $Al_2O_3$, and about 1.0 to about 6.0 wt.% rare earth oxide, $RE_2O_3$, calculated on an anhydrous basis referred to the oxides. The composited support is precalcined at about 1300° to about 1700° F. for about 0.5 to about 10 hours. In general, the demetalation activity of the catalyst with higher rare earth content within the prescribed range is increased by precalcination at the higher temperature within the prescribed range, provided the optimal temperature is not exceeded as shown in the examples which follow.

The method of preparing the catalyst with the hereinabove described support may follow standard practice. The iron group metal (i.e. iron, cobalt or nickel, especially cobalt or nickel with nickel particularly preferred) and the Group VIB metal (i.e. molybdenum, tungsten or chromium, with molybdenum particularly preferred) may be added by impregnation of the precalcined support with suitable salt solutions, followed by drying, calcination, and, if necessary presulfiding. The final catalyst composition comprises 1–10 wt.% of an iron group metal and 5–25 wt.% of a Group VIB metal, all computed on the basis of total catalyst weight and on an anhydrous basis. The iron group metal and the Group VIB metal may be present in the final catalyst as the oxides or sulfides of the metals.

The catalyst of this invention has an average pore diameter of about 120 to about 200 Å, a pore volume of about 0.45 to about 0.65 cc/gm, and a surface area of about 115 to about 160 m²/gm. At least about 60% of the total pore volume is in pores having a diameter in the range of 80 to 200 Å, and at least 5% of the total pore volume is in pores having a diameter greater than 300 Å as determined by mercury porosimetry.

In another aspect of this invention, the novel catalyst is used in an improved method for demetalizing hydrocarbon oils. The feedstock to this process may be any metal contaminated hydrocarbon, particularly a petroleum oil. Petroleum oils containing residual components, such as whole crude, residual fractions from atmospheric tower distillation and residual fractions from vacuum tower distillation are particularly well suited as feedstock and are converted to chargestocks suitable for cracking, hydrocracking or coking.

The demetalation process, which also reduces the sulfur content of the processed feed, comprises passing the feedstock and hydrogen over the demetalation catalyst of this invention under process conditions chosen from the following ranges:

|  | Broad Range | Preferred Range |
|---|---|---|
| Temperature, °F. | 500–1000 | 600–850 |
| Pressure, p.s.i.g. | 300–3000 | 500–2000 |
| Space Velocity, L.H.S.V. (volume of oil feed per volume of catalyst per hour) | 0.1–5.0 | — |
| Hydrogen Recirculation Rate, s.c.f./bbl. (standard cubic feet of hydrogen per bbl. of oil feed) | 500–15,000 | 800–8000 |

These variables may be adjusted in known manner depending on the age of the catalyst and the level of demetalation required. In a particularly preferred mode of operation of the process of this invention, the pressure is maintained at 500 to 1000 p.s.i.g., the lower end of the preferred range. In another particularly preferred mode the hydrogen recirculation is maintained at 800–2500 s.c.f./bbl.

Figure 2:
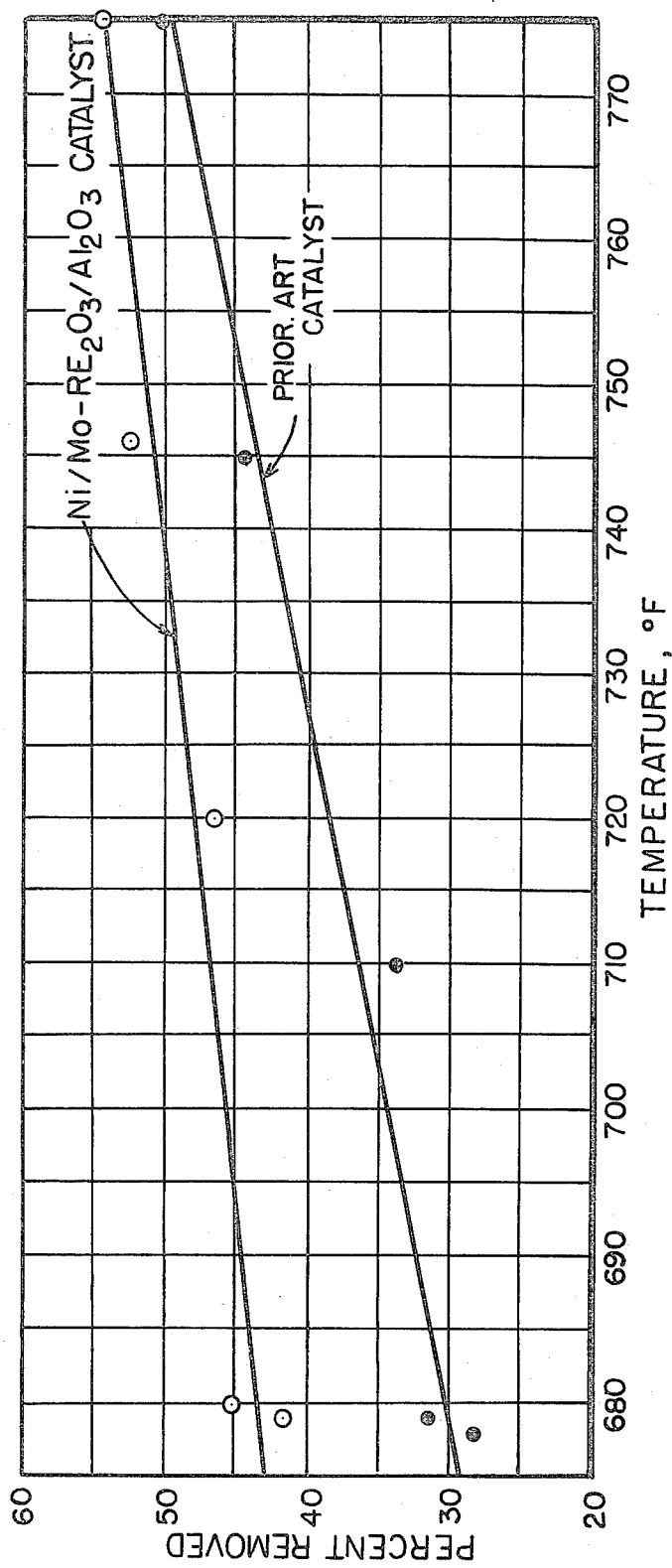
FIG. 2 depicts the improvement in Conradson Carbon removal exhibited by catalyst in accordance with the present invention.

The process of this invention has the feature that, over a wide range of temperature, the Cronradson Carbon value of the feed is more effectively reduced than when using a prior-art demetalation catalyst. This effect is shown in FIG. 2 of the drawing. Also as illustrated in the examples hereinbelow, the demetalation and desulfurization activity, and the selectivity for demetalation, are insensitive to reduced hydrogen pressure, and to reduced hydrogen circulation rate. Reduction of Conradson Carbon is highly desirable when preparing feedstock for subsequent cracking, and reduced hydrogen pressure or recirculation rate contributes to economical operation of the process.

The preferred mode for operating the novel process of this invention is to use a fixed bed of catalyst. The catalyst of this invention may be used as the sole catalyst, or it may be used in conjunction with a conventional hydrodesulfurization catalyst in a 2-bed arrangement as described in U.S. Pat. No. 4,016,067 issued Apr. 5, 1977, the entire content of which is herein incorporated by reference. It is also contemplated to employ the catalyst of this invention in a multi-bed arrangement as described in U.S. Pat. No. 4,054,508, issued Oct. 18, 1977, the entire content of which is herein incorporated by reference.

This invention is now illustrated by examples which are to be understood as not limiting on the scope of the invention, this scope being defined by the appended claims. All percentages refer to percentages by weight on an anhydrous basis unless specifically stated otherwise.

EXAMPLES

Example 1. Preparation of Catalyst Supports

This example illustrates the preparation of supports that contain 1.5, 3 and 6 wt.% rare earth oxide $RE_2O_3$ and the effect of precalcination at 1000°, 1400°, 1500° and 1600° F. Precalcination at 1000° F. does not produce supports within the scope of this invention, but is included for comparison purposes.

All supports in this example were prepared by impregnating Catapal SB alumina with a total amount of mixed rare earth nitrate solution predetermined to give the desired levels of $RE_2O_3$ in the final support. The impregnation was done in two steps. First, Catapal SB alumina powder was impregnated with the nitrate solution, dried at 250° F. and calcined for 0.25 hours at about 1700° F.; then, one part of the precalcined material was blended with two parts of Catapal SB powder, more rare earth nitrate solution added, and the blend auger extruded to form 1/32 inch pellets. The pellets were dried at 250° and precalcined in air for 4.0 hours at one of above-noted four precalcination temperatures.

The properties of the improved support are shown in Table I, samples D-L inclusive being illustrative of this invention. Pore volume distribution was determined by mercury porosimetry.

TABLE I

| | Properties of $RE_2O_3$–$Al_2O_3$ Supports after Four Hour Precalcination | | | | | | | | | | | |
|---|---|---|---|---|---|---|---|---|---|---|---|---|
| Precalcining Temp., °F. | 1000 | | | 1400 | | | 1500 | | | 1600 | | |
| Code | A | B | C | D | E | F | G | H | I | J | K | L |
| $RE_2O_3$, % wt | 1½ | 3 | 6 | 1½ | 3 | 6 | 1½ | 3 | 6 | 1½ | 3 | 6 |
| Packed Density, g/cc | 0.57 | 0.56 | 0.56 | 0.56 | 0.57 | 0.63 | 0.57 | 0.56 | 0.57 | 0.56 | 0.56 | 0.57 |
| Crush Str., lb/inch | 17 | 14 | 17 | — | — | — | — | — | — | — | — | — |
| Pore Diameter, Å | 134 | 126 | 118 | 166 | (162) | 14 | 182 | 179 | 157 | 208 | 190 | 179 |
| Poer Volume, cc/g | 0.640 | 0.613 | 0.600 | 0.628 | 0.620 | 0.570 | 0.618 | 0.613 | 0.573 | 0.633 | 0.612 | 0.577 |
| Particle Density, g/cc | 1.07 | 1.10 | 1.16 | 1.07 | 1.10 | 1.16 | 1.09 | 1.10 | 1.17 | 1.09 | 1.13 | 1.17 |
| Real Density, g/cc | 3.39 | 3.38 | 3.38 | 3.26 | 3.47 | 3.42 | 3.34 | 3.38 | 3.55 | 3.51 | 3.66 | 3.60 |
| Surface Area, m²/g | 191 | 194 | 204 | 151 | 153 | 154 | 136 | 137 | 146 | 122 | 129 | 129 |
| Pore size distribution, pv cc/Kg in pores of | | | | | | | | | | | | |
| 0–30Å diameter | 72 | 58 | 79 | 52 | 95 | 49 | 45 | 58 | 48 | 66 | 66 | 57 |
| 30–50Å diameter | 18 | 16 | 23 | 12 | 10 | 9 | 9 | 8 | 6 | 3 | 8 | 9 |
| 50–80Å diameter | 76 | 150 | 277 | 38 | 45 | 46 | 28 | 33 | 33 | 16 | 19 | 25 |
| 80–100Å diameter | 313 | 295 | 138 | 101 | 300 | 308 | 61 | 97 | 145 | 47 | 61 | 71 |
| 100–150Å diameter | 88 | 30 | 29 | 357 | 132 | 96 | 399 | 348 | 276 | 409 | 385 | 353 |
| 150–200Å diameter | 7 | 4 | 5 | 6 | 4 | 2 | 4 | 3 | 3 | 22 | 3 | 2 |
| 200–300Å diameter | 8 | 1 | 0 | 3 | 1 | 3 | 7 | 6 | 2 | 3 | 6 | 5 |
| 300+ Å diameter | 60 | 59 | 49 | 59 | 65 | 57 | 65 | 66 | 60 | 67 | 64 | 55 |

Example 2. Preparation of Catalysts

Each of the catalyst supports, A-L inclusive, described in Example 1 was impregnated with ammonium molybdate solution to incipient wetness, dried at 250° F., then impregnated to incipient wetness with nickel nitrate solution and again dried at 250° F. Each was then calcined for six hours at 1000° F. The properties of the catalysts are shown in Table II. Samples coded DC-LC, inclusive, are illustrative of the catalysts of this invention. All catalysts contained about 3½ wt.% CoO and about 10 wt.% $MoO_3$.

Example 3. Preparation of Catalysts

Catalysts were prepared by the same procedure used in Example 2 but substituting cobalt nitrate for nickel nitrate, and with only the supports that contained 1.5 wt.% and 6 wt.% $RE_2O_3$.

Example 4. Behavior of Catalysts

The catalysts of Example 2 and Example 3 were evaluated for demetalation and desulfurization activity in a shaker-bomb test utilizing as charge Lago Media atmospheric resid that contained 235 ppm vanadium and 2.12 wt.% sulfur. The apparatus and its general mode of operation are described in publications by J. W. Payne, C. W. Streed and E. K. Kent, Ind. Eng. Chem. 50, p. 47 (1958) and by S. M. Oleck and H. S. Sherry, Ind. Eng. Chem., Process Des. Dev., 16, p. 4 (1977), which are herein incorporated by reference. The results for the catalysts of Example 2 are shown in Table III. The results for the catalysts of Examples 2 and 3 are graphically summarized in FIG. 1.

Example 5

A nickel-moly catalyst that contained about 3.5 wt.% NiO and about 10 wt.% $MoO_3$, prepared according to this invention on a precalcined support that contained 1.5 wt.% $RE_2O_3$, was compared with a prior art catalyst for % Conradson Carbon removal at different temperatures. The prior art catalyst contained about 3½ wt.% CoO, and about 10 wt.% $MoO_3$ on an alumina support, and was of the demetalation type. The results are shown in FIG. 2.

Example 6

The catalysts described in Example 5 were compared at varying hydrogen to oil initial ratios using the shaker bomb test described in Example 4. Arab Lt. vacuum resid was charged and pressured with hydrogen to 2000 psig, and the test run at 750° F. for 160 minutes at 200 r.p.m. The oil to catalyst ratio by weight was 20. The results are shown in Table IV. The hydrogen to oil was varied by varying the total volume of catalyst plus oil charged.

TABLE IV

| Catalyst | Ni/Mo-$RE_2O_3$/$Al_2O_3$ | | | CO/MO - $Al_2O_3$ | | |
|---|---|---|---|---|---|---|
| Initial $H_2$/Oil SCF/B | 905 | 2190 | 3484 | 905 | 2190 | 3484 |
| Removals % | | | | | | |
| Vanadium | 74 | 73 | 73 | 67 | 73 | 74 |
| Sulfur | 57 | 55 | 56 | 51 | 53 | 51 |
| CCR | 39 | — | — | 25 | — | — |
| Selectivity, % Metals / % Sulfur | 1.30 | 1.33 | 1.30 | 1.31 | 1.38 | 1.45 |

TABLE II

Properties of 3½% NiO-10% $MoO_3$ Catalysts on $RE_2O_3$—$Al_2O_3$ Supports Precalcined Four Hours at Various Temperatures

| Precalcining Temp., °F. | 1000 | | | 1400 | | | 1500 | | | 1600 | | |
|---|---|---|---|---|---|---|---|---|---|---|---|---|
| Code | AC | BC | CC | DC | EC | FC | GC | HC | IC | JC | KC | LC |
| $RE_2O_3$ in Support, % wt | 1½ | 3 | 6 | 1½ | 3 | 6 | 1½ | 3 | 6 | 1½ | 3 | 6 |
| Packed Density, g/cc | 0.71 | 0.70 | 0.74 | 0.74 | 0.76 | 0.76 | 0.75 | 0.75 | 0.77 | 0.77 | 0.75 | 0.78 |
| Crush Str., lb/inch | — | 18 | — | — | 42 | — | — | 33 | — | — | — | — |
| Pore Diameter, Å | 122 | 113 | 102 | 154 | 142 | 133 | 157 | 152 | 146 | 178 | 164 | 156 |
| Pore Volume, cc/g | 0.537 | 0.512 | 0.491 | 0.529 | 0.522 | 0.472 | 0.501 | 0.506 | 0.481 | 0.517 | 0.496 | 0.475 |
| Particle Density, g/cc | 1.240 | 1.269 | 1.324 | 1.242 | 1.249 | 1.343 | 1.310 | 1.283 | 1.334 | 1.271 | 1.305 | 1.349 |
| Real Density, g/cc | 3.711 | 3.619 | 3.778 | 3.614 | 3.592 | 3.668 | 3.807 | 3.625 | 3.728 | 3.712 | 3.705 | 3.750 |
| Surface Area, m²/g | 181 | 181 | 192 | 137 | 147 | 142 | 128 | 133 | 132 | 116 | 121 | 122 |
| Pore size distribution, pv cc/Kg in pores of | | | | | | | | | | | | |
| 0-30Å diameter | 65 | 51 | 45 | 41 | 54 | 35 | 33 | 38 | 37 | 43 | 36 | 37 |
| 30-50Å diameter | 10 | 11 | 19 | 7 | 4 | 8 | 4 | 5 | 4 | 4 | 7 | 5 |
| 50-80Å diameter | 50 | 64 | 178 | 15 | 20 | 25 | 10 | 14 | 17 | 9 | 10 | 13 |
| 80-100Å diameter | 220 | 284 | 161 | 27 | 45 | 80 | 17 | 29 | 39 | 14 | 20 | 28 |
| 100-150Å diameter | 140 | 54 | 35 | 371 | 335 | 269 | 357 | 356 | 326 | 259 | 341 | 317 |
| 150-200Å diameter | 2 | 1 | 2 | 4 | 2 | 2 | 10 | 6 | 2 | 113 | 20 | 18 |
| 200-300Å diameter | 4 | 2 | 4 | 7 | 4 | 5 | 20 | 5 | 4 | 15 | 5 | 5 |
| 300+ Å diameter | 46 | 45 | 47 | 57 | 58 | 48 | 81 | 53 | 52 | 60 | 57 | 52 |

TABLE III

SHAKER BOMB TEST RESULTS[1]

| Precalcining Temp., °F. | 1000 | | | 1400 | | | 1500 | | | 1600 | | |
|---|---|---|---|---|---|---|---|---|---|---|---|---|
| Code | AC | BC | CC | DC | EC | FC | GC | HC | IC | JC | KC | LC |
| $RE_2O_3$ in Support, % wt | 1½ | 3 | 6 | 1½ | 3 | 6 | 1½ | 3 | 6 | 1½ | 3 | 6 |
| Devanadization, % | 64.7 | 61.7 | 56.6 | 67.2 | 65.5 | 58.7 | 71.1 | 69.8 | 66.4 | 68.5 | 66.0 | — |
| Desulfurization, % | 53.6 | 51.9 | 48.7 | 54.9 | 53.7 | 51.2 | 55.9 | 55.9 | 52.2 | 54.2 | 52.6 | — |
| Selectivity, % Metals/ % Sulfur | 1.21 | 1.19 | 1.16 | 1.22 | 1.22 | 1.15 | 1.27 | 1.25 | 1.27 | 1.26 | 1.25 | — |

[1]750° F., 2000 psig, 80 minuters, 15 g catalyst, 300 g Lago Media atm. resid 75D-29 (235 ppm V, 2.12% wt. S). These results are on equal catalyst-weight basis.

What is claimed is:

1. A catalyst for the hydrodemetalation of a metal and sulfur-contaminated hydrocarbon oil, said catalyst comprising 1–10% of an iron group metal and 5–25% of a Group VIB metal, said metals being present as the oxides or sulfides on a support precalcined at a temperature of about 1300° to about 1700° F., said precalcined support comprising at least 85 wt.% alumina and about 0.5 to about 7.0 wt.% rare earth oxide.

2. The catalyst described in claim 1 wherein at least 60% of the pore volume is in pores having a diameter in the range of 80 to 200 A.

3. The catalyst described in claim 1 wherein said support is precalcined at a temperature of about 1400° to about 1600° F.

4. The catalyst described in claim 1 wherein said support, prior to said calcination, comprises boehmite and about 1.0 to about 6.0 wt.% rare earth oxide or precursor thereof.

5. The catalyst described in claim 2 wherein said support, prior to said calcination, comprises boehmite and about 1.0 to about 6.0 wt.% rare earth oxide or precursor thereof.

6. The catalyst described in claim 1 wherein said iron group metal is cobalt.

7. The catalyst described in claim 1 wherein said iron group metal is nickel.

8. The catalyst described in claim 2 wherein said iron group metal is nickel.

9. The catalyst described in claim 2 wherein said iron group metal is nickel and said Group VIB metal is molybdenum.

10. The catalyst described in claim 5 wherein said iron group metal is nickel and said Group VIB metal is molybdenum.

11. A method for preparing an improved hydrodemetalation catalyst which comprises preparing a composite of an alpha alumina monohydrate and a rare earth oxide or precursor thereof, said composite containing, on an anhydrous basis, at least 85 wt.% alumina and about 1.0 to about 6.0 wt. % rare earth oxide or precursor thereof, precalcining said composite at a temperature of about 1300° to about 1700° F. thereby forming the catalyst support, impregnating said catalyst support with solutions of a salt of an iron group metal and a salt of a Group VIB metal, drying and calcining said impregnated support, said salt solutions providing 1–10 wt. % based on final catalyst weight of an iron group metal and 5–25 wt.% based on final catalyst weight of a Group VIB metal.

12. The method described in claim 11 wherein said iron group metal is cobalt and said Group VIB metal is molybdenum.

13. The method described in claim 11 wherein said iron group metal is nickel and said Group VIB metal is molybdenum.

* * * * *